(12) United States Patent
Inagawa

(10) Patent No.: US 7,930,609 B2
(45) Date of Patent: Apr. 19, 2011

(54) APPARATUS AND METHOD FOR VERIFYING TARGET CIRCUIT

(75) Inventor: Tsuyoshi Inagawa, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 217 days.

(21) Appl. No.: 12/232,436

(22) Filed: Sep. 17, 2008

(65) Prior Publication Data

US 2009/0077440 A1 Mar. 19, 2009

(30) Foreign Application Priority Data

Sep. 18, 2007 (JP) .................................. 2007-241541

(51) Int. Cl.
*G01R 31/28* (2006.01)
(52) U.S. Cl. ............ 714/731; 714/37; 714/39; 714/707; 714/724; 714/732; 714/735; 714/736; 714/741; 714/744; 703/1; 703/2; 703/3; 703/4; 703/13; 703/14; 703/15; 703/16; 703/17; 703/19; 716/4; 716/5; 716/6
(58) Field of Classification Search .................. None
See application file for complete search history.

(56) References Cited

U.S. PATENT DOCUMENTS

| | | | | |
|---|---|---|---|---|
| 6,353,906 | B1 * | 3/2002 | Smith et al. ................... | 714/741 |
| 6,359,479 | B1 * | 3/2002 | Oprescu ........................ | 327/141 |
| 6,567,961 | B2 * | 5/2003 | Jacob ............................. | 716/6 |
| 7,289,946 | B1 * | 10/2007 | Lee ............................... | 703/16 |
| 7,698,118 | B2 * | 4/2010 | Reblewski ..................... | 703/13 |
| 2002/0073383 | A1 * | 6/2002 | Jacob ............................. | 716/4 |
| 2005/0216247 | A1 * | 9/2005 | Ikeda et al. .................... | 703/19 |
| 2005/0229127 | A1 * | 10/2005 | Warren .......................... | 716/6 |
| 2005/0268265 | A1 * | 12/2005 | Ly et al. ......................... | 716/6 |
| 2006/0090149 | A1 * | 4/2006 | Blanco et al. .................. | 716/6 |
| 2006/0190858 | A1 * | 8/2006 | Chu et al. ....................... | 716/4 |
| 2008/0040695 | A1 * | 2/2008 | Chu et al. ....................... | 716/4 |
| 2008/0134115 | A1 * | 6/2008 | Ly et al. ......................... | 716/5 |

FOREIGN PATENT DOCUMENTS

JP 2001-229211 8/2001

* cited by examiner

*Primary Examiner* — John P Trimmings
(74) *Attorney, Agent, or Firm* — McGinn Intellectual Property Law Group, PLLC

(57) ABSTRACT

A circuit verifying method is provided for a logic circuit of a first sequential circuit which outputs a first data based on an input data in synchronization with a first clock signal, and a second sequential circuit which outputs a second data based on the first data in synchronization with a second clock signal with a period longer than that of a first clock signal. The circuit verifying method includes detecting a change of the input data in synchronization with the first clock signal; outputting a data indicating a meta stable state during a period longer than one period of the first clock signal based on the change of the input data as the first data; storing the changed input data in a storage unit based on the change of the input data; and outputting the changed input data which has been stored in the storage unit as the first data after stop the output of the data indicating the meta stable state.

20 Claims, 11 Drawing Sheets

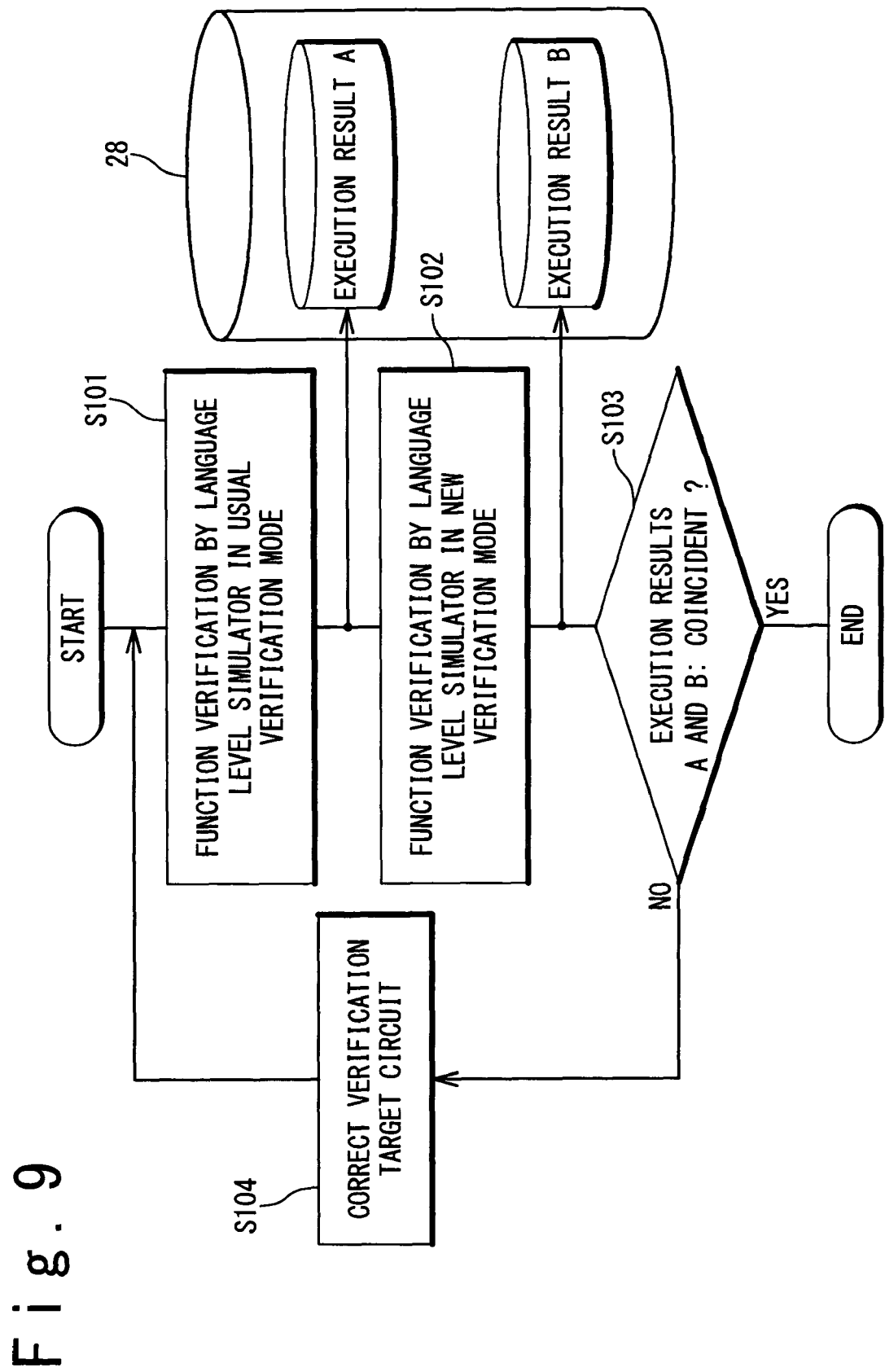

APPARATUS AND METHOD FOR VERIFYING TARGET CIRCUIT

INCORPORATION BY REFERENCE

This patent application claims priority on convention based on Japanese Patent Application No. 2007-241541. The disclosure thereof is incorporated herein by reference.

BACKGROUND OF THE INVENTION

1. Field of the Invention

The present invention relates to a circuit verifying method and a circuit verifying apparatus, and more particularly relates to a circuit verifying method and a circuit verifying apparatus, in which an operation of a semiconductor integrated circuit including asynchronous sequential circuits is verified.

2. Description of Related Art

When data transmission is carried out between sequential circuits on a transmission side and a reception side in an asynchronous sequential circuit, there is a case that an oscillation state of the output from the sequential circuit on the reception side is transferred to a sequential circuit or combinational circuit connected to a later stage. In this case, the logic of data outputted from the sequential circuit on the reception side cannot be determined. Such a state is referred to as a meta stable state, which causes a correct operation of a logic circuit containing the asynchronous sequential circuits. For this reason, in the design of the logic circuit, the operation verification in which the meta stable state is taken into consideration is carried out in a function simulation in an HDL (Hardware Description Language) level.

Such a function simulation is carried out under various conditions in which the period and phase of a clock signal supplied to each of the plurality of sequential circuits are changed. Usually, since the meta stable state generated in the sequential circuit on the reception side is generated in the sequential circuit on the transmission side, the function simulation is performed in which the meta stable state is taken into consideration. Thus, it is possible to increase a generation possibility of an erroneous operation in the logic circuit as a verification target circuit, and reproduce the same operation as the actual circuit and then detect the erroneous operation.

The detail of the simulation for verifying the operation of the asynchronous sequential circuit will be described below with reference to FIGS. 1A and 1B and FIG. 2A. The verifying operation in the conventional technique will be described below by using a function verification for an asynchronous sequential circuit shown in FIG. 5 as one example.

A sequential circuit FF2 on the reception side latches an enable signal EN1, i.e., an output signal Q1 from a sequential circuit FF1 on the transmission side at an active edge, e.g., a rising edge of an input clock signal CLK2. If the enable signal EN1 is a normal signal, namely, if the pulse width of the enable signal EN1 outputted from the sequential circuit FF1 is longer than one period of the clock signal CLK2, the sequential circuit FF2 latches the enable signal EN1 or the output signal Q1. At this time, the sequential circuit FF2 outputs an enable signal EN2. Thus, the asynchronous sequential circuit is determined to be in the normal state.

On the other hand, if the pulse width of the enable signal EN1 is shorter than one period of the clock signal CLK2 supplied to the sequential circuit FF2, namely, when an incorrect enable signal EN1 is supplied, the sequential circuit FF2 cannot latch the enable signal EN1, and output it to a combinational circuit CC2 at a next stage.

Referring to FIG. 1A, if the enable signal EN1 takes an incorrect logical data, the signal level of the enable signal EN1 or the output signal Q1 of the sequential circuit FF1 is always "0" at each of times T2, T8, . . . , or the rising edges of the clock signal CLK2. In this case, the enable signal EN2 outputted from the sequential circuit FF2 is always "0". In this way, the asynchronous sequential circuit as a verification target circuit is detected to be the normal circuit, because the incorrect enable signal EN1 is not sent to the combinational circuit at the next stage.

However, even if the incorrect data signal EN1 is supplied, there is a case that the sequential circuit FF2 latches the enable signal EN1, depending on the differences between the clock signal CLK1 and the clock signal CLK2 in period and phase. For example, as shown in FIG. 1B, if the signal level of the output signal Q1 is "1", the asynchronous sequential circuit as the verification target circuit sends the correct enable signal EN1 to the combinational circuit at the next stage as the enable signal EN2 when the clock signal CLK2 becomes active (at the time T8). In this case, the asynchronous sequential circuit is determined to be in the normal state, irrespectively of the circuit in an erroneous state. Usually, in order to avoid such a verification error, the verification is carried out under many conditions by changing the phase difference between the clock signal CLK1 and the clock signal CLK2 and the clock periods. Then, since those verification results are statistically processed, the generation of a verification error is suppressed. However, when a difference in the period is large between the clock signal CLK1 and the clock signal CLK2, the period becomes long (between the times T3 and T9 in FIG. 1B) in which the incorrect enable signal EN1 is possibly latched by the sequential circuit FF2. In this case, a possibility that the verification error is generated becomes high, and the possibility that the circuit to be determined to be incorrect is determined to be in the normal state is not small.

A conventional technique for reducing the possibility that the verification error is generated is described in Japanese Patent Application Publication (JP-P2001-229211A: conventional technique 1). A verifying method described in the conventional technique 1 defines whether or not an output data is in the meta stable state based on whether or not the clock signal of a logic circuit is active and whether or not the input data to the logic circuit differs from a previously held value, when the operation of the logic circuit should be verified. In the verifying method described in the conventional technique 1, a predetermined data indicating the meta stable state is outputted from the logic circuit during a predetermined period during which the state is defined as the meta stable state.

FIG. 2A is a timing chart showing the operation of the asynchronous sequential circuit that is simulated by the verifying method described in the conventional technique 1. With reference to FIG. 2A, when detecting the change in the signal level of the enable signal EN1 at the active edge, i.e., the rising edge of the time T3, the sequential circuit FF1 outputs the predetermined value ("1" or "0") indicating the meta stable state during one period of the clock signal CLK1 (from time T3 to time T5) as the enable signal EN1. At this time, if a time Ta from the time T3 corresponding to the active edge of the sequential circuit FF1 to the active edge of the clock CLK2 is shorter than the one period of the clock signal CLK1, the sequential circuit FF2 latches the data indicating the meta stable state. For example, as shown in FIG. 2A, since the active edge of the clock signal CLK2 exists at a time T4 during a period from the time T3 to the time T5, the sequential circuit FF2 outputs the data indicating the meta stable state during the period from the time T4 to the time T10 (during one period of the clock signal CLK2) as the enable signal EN2.

Since the meta stable state is sent to and latched by the sequential circuit FF2, a verifying apparatus can determine a verification target circuit to be an incorrect circuit. In this way, according to the method described in the conventional technique 1, when the incorrect data Din is inputted, the data indicating the meta stable state is outputted during one period of the clock signal CLK1. Thus, it is possible to reduce the possibility that the sequential circuit FF2 latches the incorrect enable signal EN1. In case of this example, according to the method of the conventional technique 1, even if the clock signal CLK2 becomes active during a period between the times T3 and T5 during which the incorrect enable signal EN1 is supplied, it is possible to latch the data indicating the meta stable state. Thus, it is possible to carry out the asynchronous verification in the meta stable state in a sequential circuit and a combinational circuit that are connected to the sequential circuit FF2 or later.

In the verifying method described in the conventional technique 1, the time in which the asynchronous sequential circuit is defined to be in the meta stable state is determined based on the clock signal CLK1 supplied to the sequential circuit FF1. In the conventional technique 1, the meta stable state and the normal state are switched in accordance with the active edge or rising edge of the clock signal CLK1. Thus, the output period of the data indicating the meta stable state becomes shorter than one period of the clock signal to the sequential circuit on the transmission side. For example, if the period of the clock signal CLK2 is close to the period of the clock signal CLK1, a possibility increases that the time Ta from the active edge of the clock signal CLK1 to the active edge of the clock signal CLK2 is shorter than the one period of the clock signal CLK1. That is, the possibility becomes lower that the clock signal CLK2 becomes active within the period during which the incorrect enable signal EN1 may be latched by the sequential circuit FF2, and thereby the foregoing verification error becomes hard to generate.

However, when the period of the clock signal CLK2 is longer than the period of the clock signal CLK1 so that the difference is large, as shown in FIG. 2B, a possibility increases that the time Ta becomes longer than the one period of the clock signal CLK1. In such a case, the possibility increases that the incorrect enable signal EN1 is latched by the sequential circuit FF2, and propagated as the enable signal EN2. For this reason, in the method described in the conventional technique 1, when the period of the clock signal CLK2 is longer than the period of the clock signal CLK1 so that the difference is larger, there is a case that the asynchronous verification in the meta stable state cannot be carried out in a circuit connected to the later stage of the sequential circuit FF2, even if the phase of the clock signal CLK2 is changed.

Therefore, even in the method of the conventional technique 1, the function simulation for the asynchronous circuit must be executed under the many conditions in which the phases and period of the clock signals CLK1 and CLK2 are changed. For this reason, the description of the asynchronous circuit necessary for the function simulation is complicated, which makes the time of the function simulation long.

SUMMARY

In an aspect of the present invention, a circuit verifying method is provided for a logic circuit of a first sequential circuit which outputs a first data based on an input data in synchronization with a first clock signal, and a second sequential circuit which outputs a second data based on the first data in synchronization with a second clock signal with a period longer than that of a first clock signal. The circuit verifying method includes detecting a change of the input data in synchronization with the first clock signal; outputting a data indicating a meta stable state during a period longer than one period of the first clock signal based on the change of the input data as the first data; storing the changed input data in a storage unit based on the change of the input data; and outputting the changed input data which has been stored in the storage unit as the first data after stop the output of the data indicating the meta stable state.

In another aspect of the present invention, a circuit verifying apparatus is provided for a logic circuit of a first sequential circuit which outputs a first data based on an input data in synchronization with a first clock signal, and a second sequential circuit which outputs a second data based on the first data in synchronization with a second clock signal with a period longer than that of a first clock signal. The circuit verifying apparatus includes a detecting section configured to detect a change of the input data in synchronization with the first clock signal; a logic circuit calculating section configured to output a data indicating a meta stable state during a period longer than one period of the first clock signal based on the change of the input data as the first data; and a storage unit in which the changed input data is stored based on the change of the input data. The logic circuit calculating section outputs the changed input data which has been stored in the storage unit as the first data after stop the output of the data indicating the meta stable state.

In still another aspect of the present invention, a computer-readable medium is provided in which a computer executable instructions code is stored to cause the computer to realize a circuit verifying method for a logic circuit of a first sequential circuit which outputs a first data based on an input data in synchronization with a first clock signal, and a second sequential circuit which outputs a second data based on the first data in synchronization with a second clock signal with a period longer than that of a first clock signal. The circuit verifying method includes detecting a change of the input data in synchronization with the first clock signal; outputting a data indicating a meta stable state during a period longer than one period of the first clock signal based on the change of the input data as the first data; storing the changed input data in a storage unit based on the change of the input data; and outputting the changed input data which has been stored in the storage unit as the first data after stop the output of the data indicating the meta stable state.

According to the present invention, it is possible to reduce the number of times of the function verification of the asynchronous circuit in the meta stable state, and as a result of it, the function verification time of the asynchronous circuit.

Also, the operation close to that of an actual asynchronous circuit can be simulated by using a computer.

BRIEF DESCRIPTION OF THE DRAWINGS

The above and other objects, advantages and features of the present invention will be more apparent from the following description of certain embodiments taken in conjunction with the accompanying drawings, in which:

FIG. 9 is a flowchart showing a circuit verifying method according to the present invention.

DESCRIPTION OF PREFERRED
EMBODIMENTS

Hereinafter, a circuit verifying apparatus according to the present invention will be described in detail with reference to the attached drawings. In the present invention, the circuit verifying apparatus performs a function simulation in a language level on an asynchronous circuit shown in FIG. 5.
(Configuration)

Figure 1A:
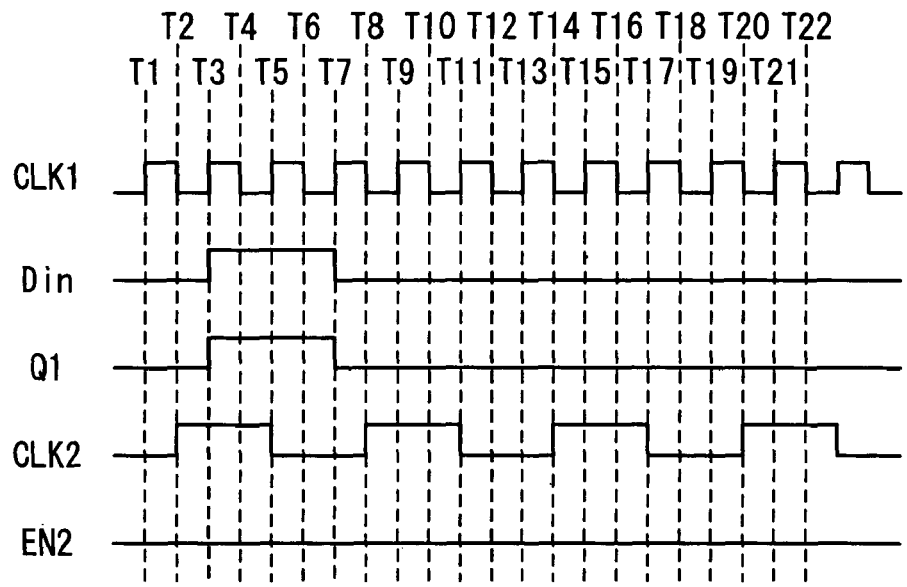
FIGS. 1A and 1B are timing charts showing operations of a verification target circuit in a simulation in a conventional technique.
Figure 1B:
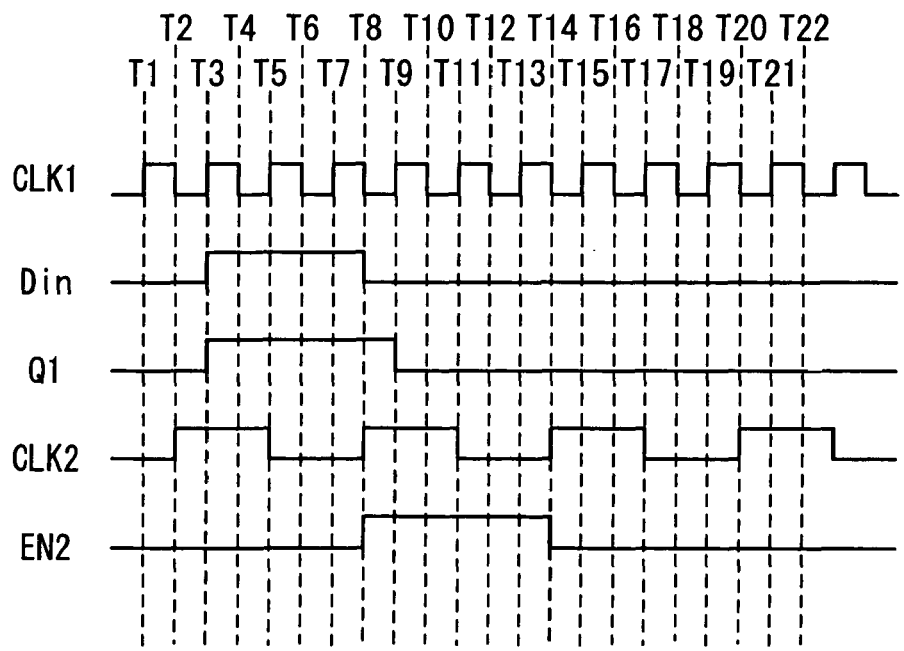
Figure 2A:
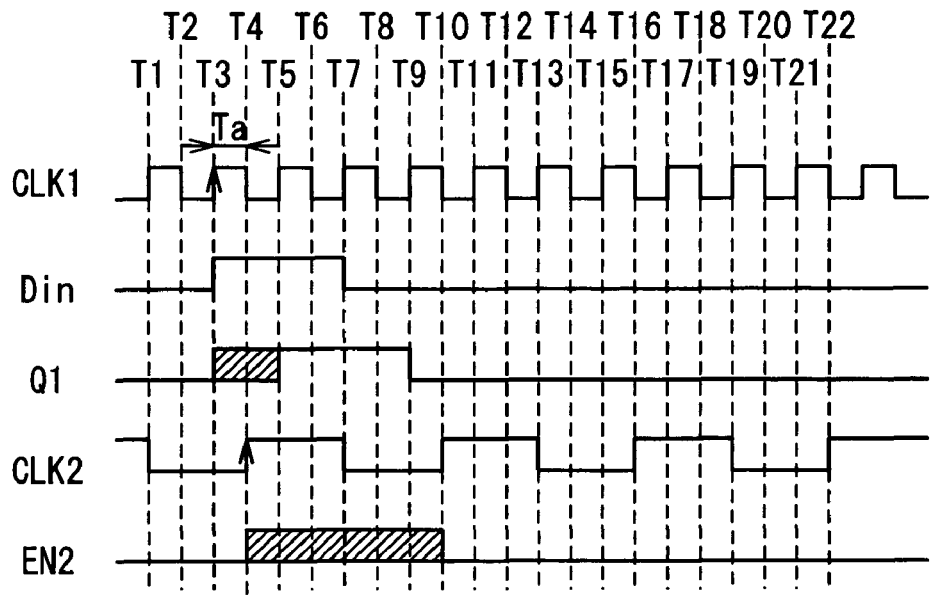
FIG. 2A is a timing chart showing an operation of the verification target circuit in the simulation in the conventional technique.
Figure 2B:
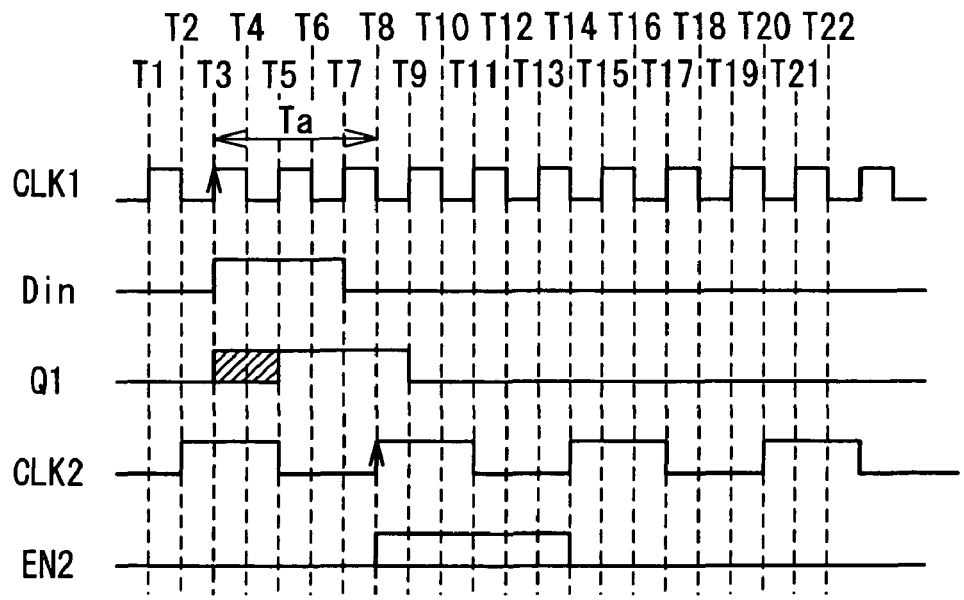
FIG. 2B is a timing chart showing another operation of the verification target circuit in the simulation in the conventional technique.
Figure 3:
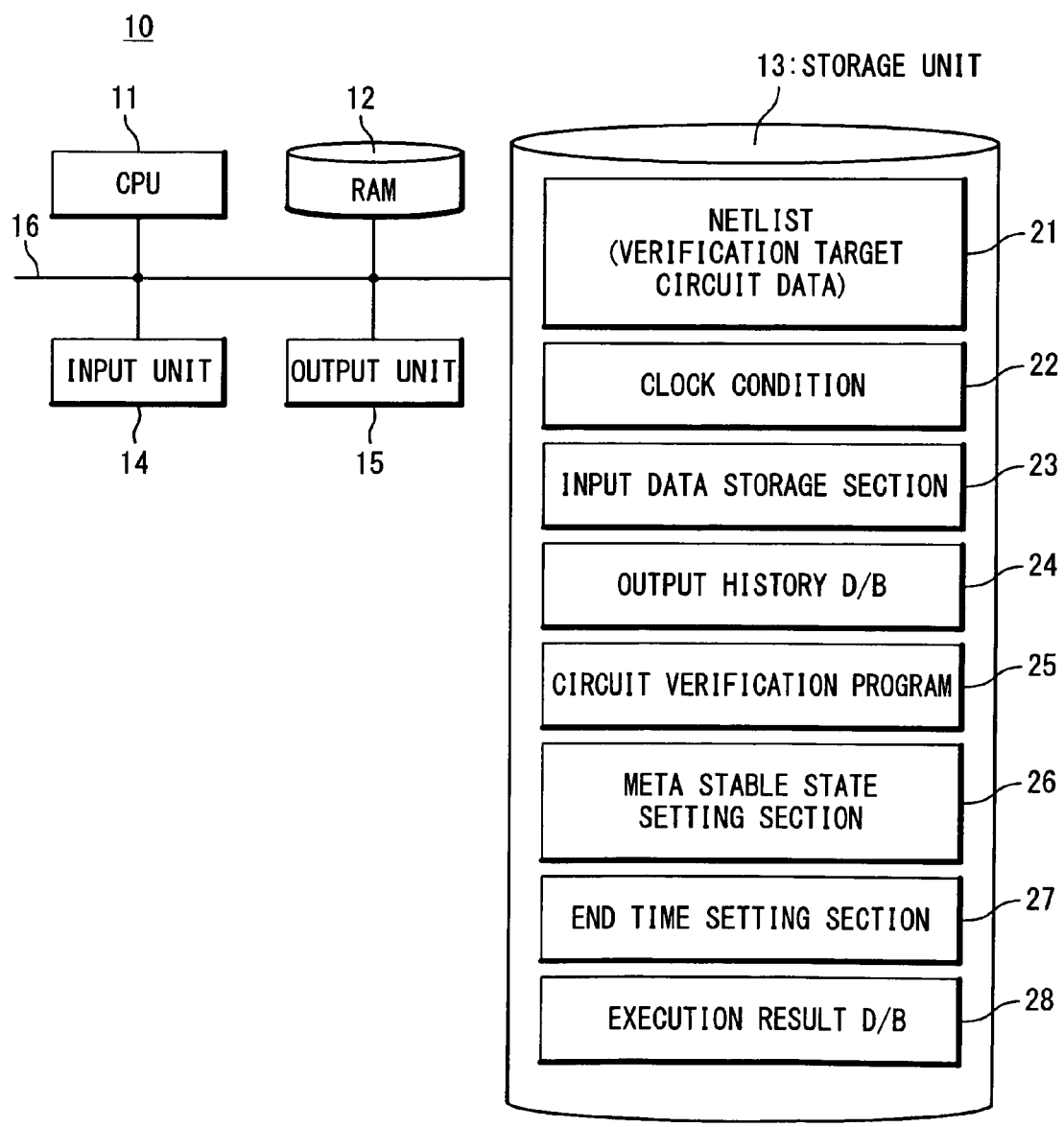
FIG. 3 is a block diagram showing the configuration of a circuit verifying apparatus according to the present invention.
Figure 4:
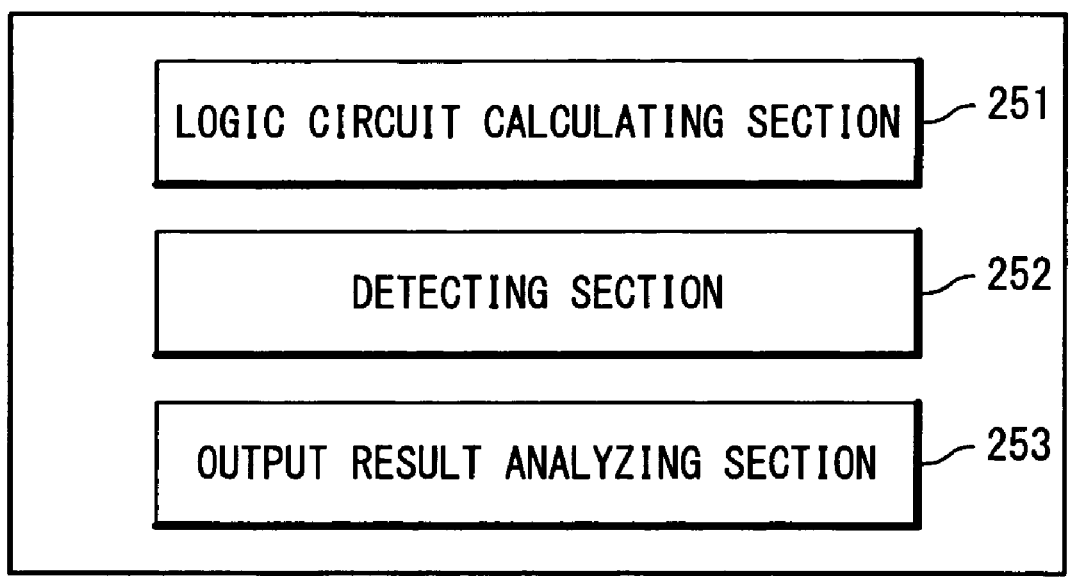
FIG. 4 is a function block diagram showing the configuration of a circuit verification program executed in the circuit verifying apparatus according to the present invention.

The configuration of a circuit verifying apparatus 10 according to the present invention will be described. FIG. 3 is a block diagram showing the configuration of the circuit verifying apparatus 10. With reference to FIG. 3, the circuit verifying apparatus 10 according to the present invention includes a CPU 11, a RAM 12, a storage unit 13, an input unit 14 and an output unit 15, which are connected through a bus 16 to each other.

The input unit 14 such as a keyboard and a mouse is operated by a user, and consequently outputs various data to the CPU 11 and the storage unit 13. The output unit 15 is exemplified as a monitor and a printer, and the result of the circuit analysis outputted by the CPU 11 is represented in a format that can be visually checked by the user. The storage unit 13 is such as a hard disk and a memory. The storage unit 13 stores a verification target circuit data (including netlist) 21, a clock condition 22, an input data storage section 23, an output history database (D/B) 24, a circuit verification program 25, a meta stable state setting section 26, an end time setting section 27, and an execution result database (D/B) 28. The circuit verification program 25 is stored in a storage medium and loaded into the storage unit 13. The CPU 11 executes the circuit verification program 25 stored in the storage unit 13 in response to an instruction from the input unit 14 to execute processes for a circuit verification. At this time, various data and the program are read out from the storage unit 13 and are temporally stored in the RAM 12, and the CPU 11 uses the data in the RAM 12 and executes the processes.

Figure 5:
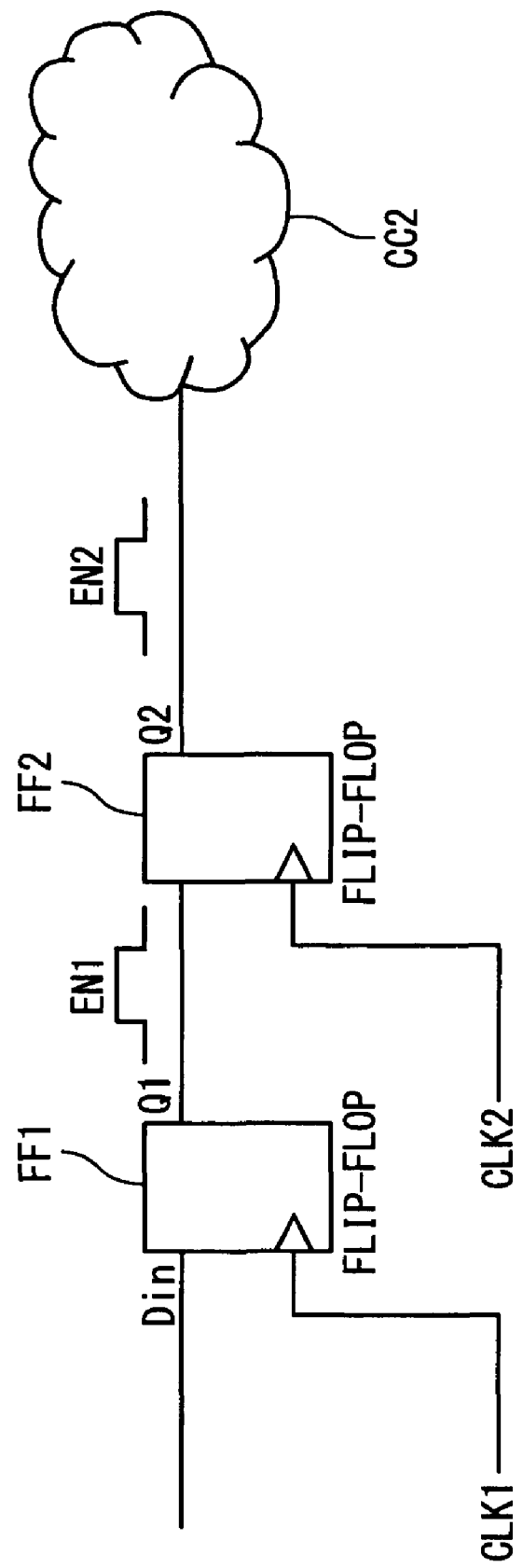
FIG. 5 is a block diagram showing the configuration of the verification target circuit.

The verification target circuit data 21 is described in HDL language. For example, the verification target circuit data 21 is represented by a Register Transfer Level (RTL) description synthesized from a behavioral description in a system design. The verification target circuit data 21 in this embodiment is the RTL description that represents the verification target circuit including an asynchronous circuit of sequential circuits FF1 and FF2 and a combinational circuit CC2, as shown in FIG. 5. The clock condition 22 is condition data to determine the period and phases of clock signals CLK1 and CLK2 supplied to the asynchronous sequential circuits targeted for the verification. The clock condition 22 may be recorded in advance in the storage unit 13 or may use data supplied from the input unit 14.

The input data storage section 23 is a region in which a data (the signal level) of an enable signal EN1 supplied to a sequential circuit FF1 on a transmission side in the asynchronous sequential circuit is stored. The enable signal EN1 is stored in the input data storage section 23 for every predetermined time. Here, in order to reduce a storing region, the stored data of the input data storage section 23 is preferred to be updated to the latest data.

The output signal Q2 (an enable signal EN2) outputted by a sequential circuit FF2 on a reception side of the asynchronous circuit as the verification target circuit is stored in the output history D/B 24 periodically or non-periodically. Preferably, the clock condition 21 used in the verification, the data and signal width of the enable signal EN1 to be supplied to the verification target circuit, and the data and signal width of the output signal Q2 are related to each other and stored in the output history database 24.

The circuit verification program 25 is executed by the CPU 11 and attains the function verification and timing modification of the verification target circuit data 21 after the system design. The circuit verification program 25 is executed by the CPU 11, attains the various functions of a logic circuit calculating section 251, a detecting section 252 and an output result analyzing section 253.

The logic circuit calculating section 251 is a language level simulator and simulates a data transferring operation of the asynchronous circuit in accordance with the verification target circuit data 21 of the verification target circuit and the clock condition 22. With reference to FIG. 5, the logic circuit calculating section 251 in this embodiment simulates the operation of the sequential circuit FF1 on the transmission side and the sequential circuit FF2 on the reception side of the asynchronous circuit. Also, this simulates the operation of a combinational circuit CC2 including other sequential circuits connected to the later stage of the sequential circuit FF2.

In detail, the logic circuit calculating section 251 receives the enable signal EN1 and the clock signal CLK1 for the asynchronous circuit, and calculates the behavior of the sequential circuit FF1 and then outputs the output signal Q1 from the sequential circuit FF1 as an enable signal EN1. Also, the logic circuit calculating section 251 calculates the behavior of the sequential circuit FF2 in accordance with the output signal Q1 and the clock signal CLK2 and outputs the output signal Q2 as an enable signal EN2 to the combinational circuit CC2 at the next stage. Here, the logic circuit calculating section 251 carries out the setting so that the sequential circuit FF1 carries out an erroneous operation in verification of the operation of the asynchronous circuit when an incorrect input data EN1 is supplied to the circuit FF1. The logic circuit calculating section 251 in this embodiment sets a flag (True) in a meta stable state setting section 26 and consequently sets that the sequential circuit FF2 as the verification target circuit is in the meta stable state. Or, the logic circuit calculating section 251 may set that the sequential circuit FF2 is in the meta stable state, by storing a data indicative of the meta stable state in the meta stable state setting section 26.

When the meta stable state is set, the logic circuit calculating section 251 carries out the calculation so that the data indicating the meta stable state (i.e., "1" or "0", to be referred to as a meta stable state data Dm) is outputted as the output signal Q1 (enable signal EN1) from the sequential circuit FF1. Also, when the sequential circuit FF2 becomes active while the meta stable state data Dm is outputted, the logic circuit calculating section 251 carries out the calculation so that the sequential circuit FF2 latches the meta stable state data Dm and sends to the combinational circuit CC2 in the later stage. It should be noted that the meta stable state data Dm may be any of a data equal to the output data of the sequential circuit FF1, a different data from the output data and a fixed data.

Also, the logic circuit calculating section 251 sets a period during which the meta stable state data is outputted or during which the sequential circuit is set to the meta stable state, to the end time setting section 27. Here, the period during which the meta stable state data is outputted is shorter than one period of the clock signal CLK2. Also, the period during which the meta stable state data is outputted is preferred to be set to be longer than a time Ta from the active edge of the clock signal CLK1 to the active edge of the clock signal CLK2. The period during which the meta stable state data is outputted may be fixedly set or may be changed for each clock condition 21 used at the time of the verification. Also, the period during which the meta stable state data is outputted may be set in consideration of a Setup time and Hold time of the sequential circuit.

Moreover, the logic circuit calculating section 251 in this embodiment is preferred to have both of a usual verification mode in which an expectation data of a circuit to be designed is verified without any output of the meta stable state data, and a new verification mode in which the function of the circuit to be designed is verified when the meta stable state data is outputted. In the usual verification mode, the logic circuit calculating section 251 performs a usual logic operation on the verification target circuit data 21 produced in a system design phase. Consequently, the logic circuit calculating section 251 can simulate the operation of a verification position in the verification target circuit (for example, the signal levels and delay amounts of the input and output signals) and can output the expectation data of the operation of the verification target circuit. On the other hand, in the new verification mode, by executing a flow which will be described later, the meta stable state is sent to the combinational circuit CC2 as the verification target circuit, and the operation of the verification position is simulated. The logic circuit calculating section 251 stores the verification results in the usual verification mode and the new verification mode (for example, the signal levels and the delay amounts of the verification position) in the execution result database 28 as an execution result A and an execution result B.

The detecting section 252 detects the input data Din supplied to the sequential circuit FF1 and the output signals Q1 and Q2 from the sequential circuits FF1 and FF2 during the simulation and records them in the input data storage section 23 and the output history database 24. The detecting section 252 is preferred to record the output signals Q1 and Q2 for each time Tn, which may correspond to the clock signal.

The output result analyzing section 253 refers to the output history database 24 and determines whether the asynchronous circuit as the verification target circuit is in a correct state or in a incorrect state based on the result of the verifications that are carried out plural times under the same clock condition 21 (the signal levels of the output signal Q2). In detail, the output result analyzing section 253 executes a statistical process to the signal levels of the plurality of output signals Q2 (the enable signals EN2) as the verification results, and recognizes the signal whose signal level does not become constant, as a meta stable state signal, and determines whether or not the asynchronous circuit is in the correct state.

Also, the output result analyzing section 253 compares the verification result (the execution result A) in the usual verification mode and the verification result (the execution result B) in the new verification mode at the verification position specified in the combinational circuit CC2 and determines whether the verification target circuit including the combinational circuit CC2 is in the correct state or the incorrect state.

The execution result database 28 records the verification result obtained by executing the circuit verification program 25. Here, the verification result (the execution result A) in the usual verification mode and the verification result (the execution result B) in the new verification mode are preferred to be recorded in the execution result database 28 while they are related to the verification target circuit (the verification position).

(Asynchronous Circuit Verification Operation in New Verification Mode)

Figure 6A:
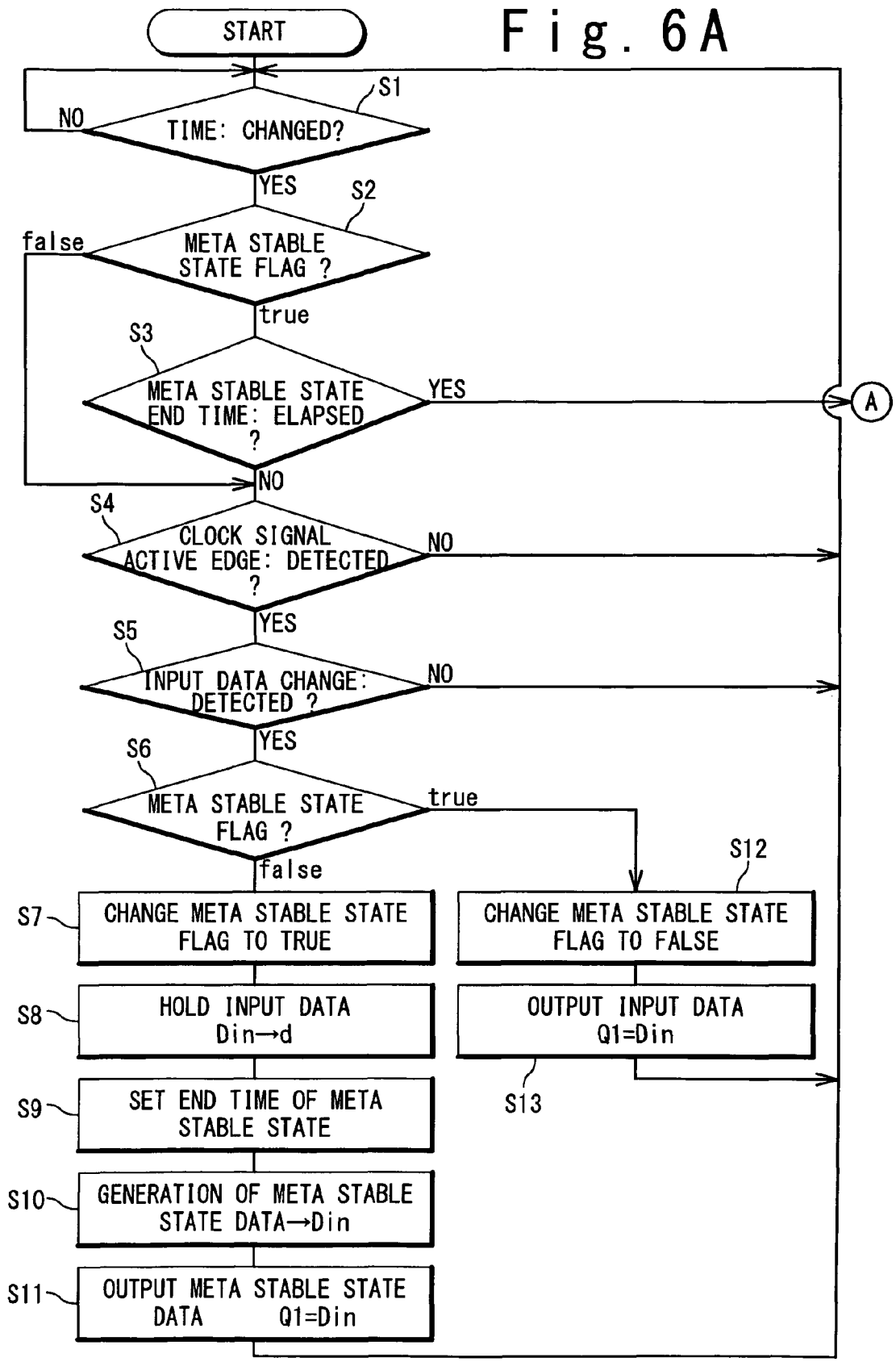
FIGS. 6A and 6B are a flowchart showing an operation of the circuit verifying apparatus according to a first embodiment of the present invention.
Figure 6B:
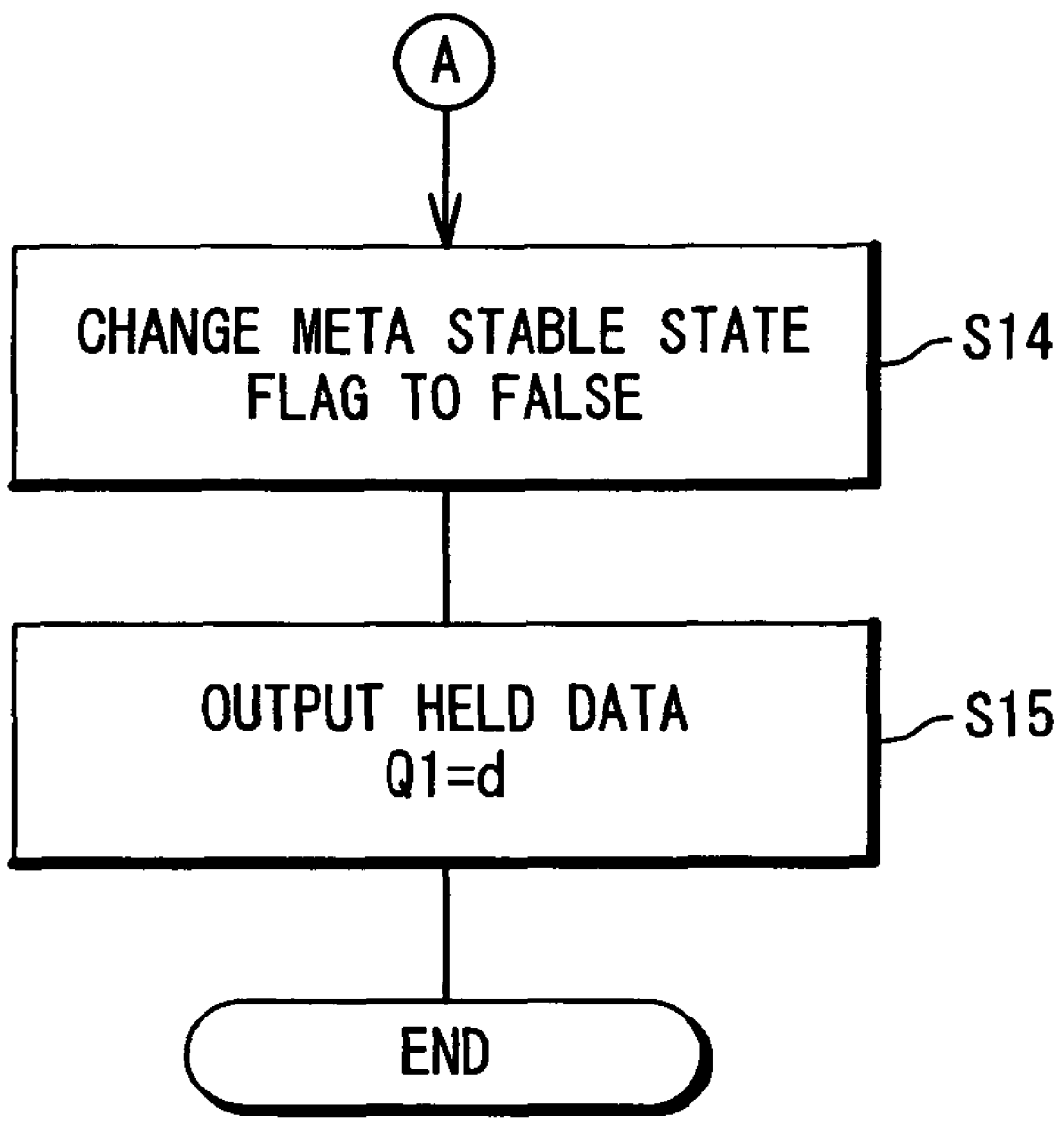

The detail of the verifying operation of the asynchronous circuit in the new verification mode by the circuit verifying apparatus 10 according to the first embodiment of the present invention will be described below with reference to FIGS. 6A and 6B and FIGS. 7A and 7B. FIGS. 6A and 6B are a flowchart showing an operation for determining the output signal Q1 of the sequential circuit FF1 of the asynchronous circuit to be verified by the circuit verifying apparatus 10 of the present invention. The circuit verifying apparatus 10 in the first embodiment operates as a cycle-based simulator for evaluating a signal based on only a clock edge. A series of steps S1 to S15 shown in FIGS. 6A and 6B is assumed to be performed for each optionally predetermined time that does not exceed the period of the clock signal CLK1 supplied to the sequential circuit FF1 (i.e., every period between the times T1 and T2, between the times T2 and T3, . . . , between times Tn and Tn+1, and n is a natural number).

At the time Tn, the logic circuit calculating section 251 refers to the meta stable state setting section 26 and checks whether or not the verification target circuit is set to the meta stable state based on the meta stable state flag (Steps S1 and S2). Here, if the flag set in the meta stable state setting section 26 is True, the logic circuit calculating section 251 refers to the end time setting section 27 and checks whether or not the time reaches an end time Te of the meta stable state (Step S3). At the step S2, if the flag set in the meta stable state setting section 26 is False, or if it does not reach the end time Te of the meta stable state so that the meta stable state is kept (Step S3: No), the detecting section 252 monitors the clock signal CLK1 until detecting an active edge (for example, a rising edge) (Step S4: No).

If detecting the active edge of the clock signal CLK1 (Step S4: Yes), the detecting section 252 extracts an input data Din at that time and compares with an input data (variable d) recorded in the input data storage section 23 (Step S5). If the detecting section 252 does not detect any change in the input data Din, namely, if the input data Din is equal to the variable d, the operation flow proceeds to the step S1 (Step S5: No). It should be noted that "0" is assumed to be set as the initial value of the variable d in this embodiment.

If the detecting section 252 detects a change in the input data Din, namely, if the input data Din indicates a data that differs from the variable d recorded in the input data storage section 23 (Step S5: Yes), the logic circuit calculating section 251 checks whether the flag set in the meta stable state setting section 26 is True or False (Step S6). Here, if the flag set in the meta stable state setting section 26 is False, the logic circuit calculating section 251 sets the flag in the meta stable state setting section 26 to True and sets the asynchronous circuit to the meta stable state (Step S7). Through the steps S4 to S7, the asynchronous circuit that is not in the meta stable state is set to the meta stable state on the basis of the change in the input data Din.

When the meta stable state flag is set to True, the detecting section 252 defines the input data Din, which is extracted at the step S5, as the variable d and records it in the input data storage section 23 (Step S8). Consequently, the input data d changed from the input data recorded at a previous time can be held as the input data Din. Also, the logic circuit calculating section 251 sets the end time Te of the meta stable state (Step S9). Thus, the period is set during which the asynchronous circuit as a design target is in the meta stable state. That is, the period of the meta stable state is the period from when the flag is set at the step S7 and to the end time Te set at the step S9. Here, the end time Te of the meta stable state is set to become shorter than one period of the clock signal CLK2 that is supplied to the sequential circuit FF2. It should be noted that preferably, the period of the meta stable state is set to be longer than the time Ta between the active edge of the clock signal CLK1 when the input signal is latched and the active edge of the clock signal CLK2. Also, the period of the meta stable state is preferred to be the time of the one period or more of the clock signal CLK1. Moreover, a value of the sequential circuit in which the Setup time and Hold time are considered may be set as the end time Te.

At the step S7, when the flag indicating the meta stable state is set, the logic circuit calculating section 251 generates the meta stable state data Dm (any of "1" and "0") and outputs the data as the output signal Q1 from the sequential circuit FF1 (Steps S10 and S11). Consequently, the sequential circuit FF1 in the asynchronous circuit to be set to the meta stable state outputs the meta stable state data Dm whose logic is not determined, as the output signal Q1 corresponding to the incorrect enable signal EN1. In the logic circuit calculating section 251, the operation flow proceeds to the step S1 after the step S11 and waits for the coming of the next time Tn+1.

The steps S6 to S10 show a process when the input data Din (the signal level of the enable signal EN1) is changed while the asynchronous circuit is not set to the meta stable state. Through this process, the asynchronous circuit as the verification target circuit is set to the meta stable state. Then, the sequential circuit FF1 outputs the enable state data Dm whose logic is not determined as the output signal Q1. At this time, the period of the enable state is also set.

On the other hand, if checking that the flag set in the meta stable state setting section 26 is True (Step S6: True), the logic circuit calculating section 251 changes the flag set in the meta stable state setting section 26 to False (Step S12). Thus, the meta stable state set in the asynchronous circuit is released. In succession, in the logic circuit calculating section 251, the input data Din is latched by the sequential circuit FF1, and is outputted as the output signal Q1 (the enable signal EN1) (Step S13). After the step S13, the operation flow proceeds to the step S1 and waits for the coming of the next time Tn+1. Through the steps S12 and S13, the meta stable state is released in accordance with the change in the input data Din in the meta stable state. Thus, the input data Din is latched by the sequential circuit FF1, and the simulation can be carried out as described above.

During the period in the meta stable state, when the time changes from Tn to the next time Tn+1 (Step S1: Yes; S2: True), the logic circuit calculating section 251 checks the end time Te set in the end time setting section 27 (Step S3). At this time, when the end time Te has been passed, the logic circuit calculating section 251 sets the flag in the meta stable state setting section 26 to False (Step S14). Thus, the meta stable state of the asynchronous circuit is released. In succession, the logic circuit calculating section 251 outputs the variable d, which is recorded in the input data storage section 23, as the output signal Q1 of the sequential circuit FF1 (Step S15). Through the steps S14 and SIS, the meta stable state is released in response to the end time Te, irrespectively of the presence or absence of the change in the input data Din, and the state is returned to the state prior to the meta stable state. When the step S15 is ended, the operation flow departs from the flowchart shown in FIGS. 6A and 6B.

Also, the logic circuit calculating section 251 simulates the operation of the sequential circuit FF2 on the basis of the output signal Q1 from the sequential circuit FF1. The logic circuit calculating section 251 operates the sequential circuit FF2 to latch the output signal Q1 when the clock signal CLK supplied to the sequential circuit FF2 is active. The simulation of the operation of the sequential circuit FF2 is similar to the conventional case. Thus, its detailed description is omitted.

Moreover, the detecting section 252 records the output signal Q2 (the enable signal EN2), which is outputted from the sequential circuit FF2 of the asynchronous circuit as the verification target circuit, in the output history database 27. At this time, the output signal Q2 is preferred to be recorded in relation to the clock condition 21 used in the verification and the input history of the input data Din. The verification of the asynchronous circuit is performed plural times under the same clock condition 21. The output result analyzing section 253 performs a statistical process on the results (the signal level of the output signal Q2) and consequently checks the presence or absence of the transmission of the meta stable state data Dm to the later stage of the sequential circuit FF2, namely, whether or not the asynchronous circuit is in the correct state.

(Operation of Asynchronous Circuit in Simulation)

Figure 7A:
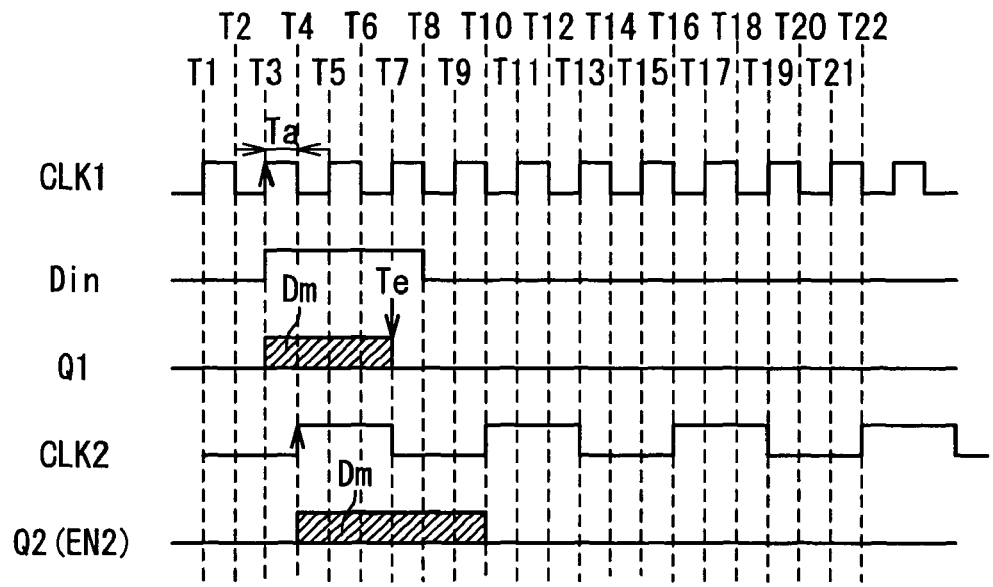
FIGS. 7A and 7B are timing charts showing operations of the verification target circuit simulated by the circuit verifying apparatus according to the present invention.
Figure 7B:
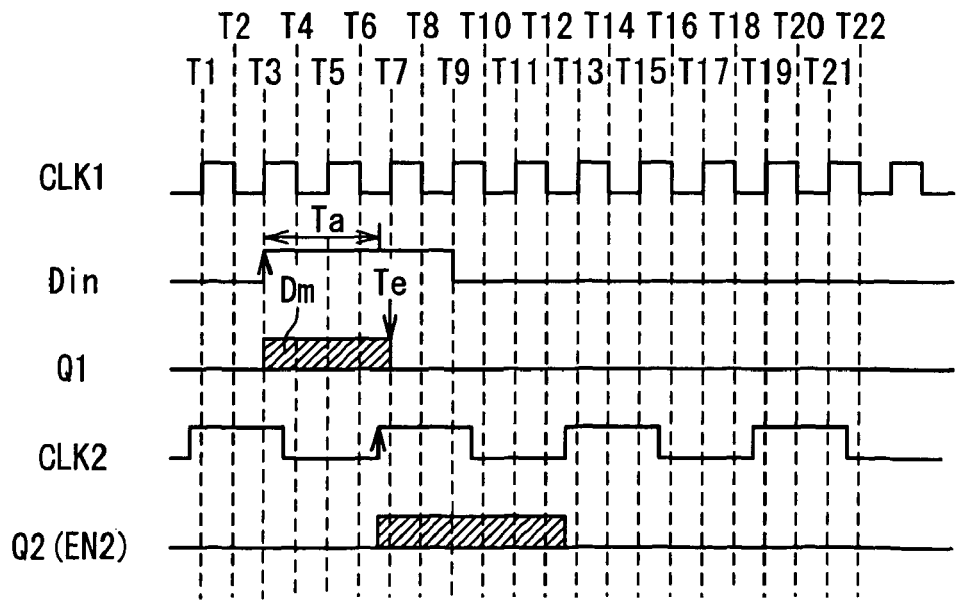

FIGS. 7A and 7B are timing charts showing the operation of the asynchronous circuit verified by the circuit verifying apparatus 10 based on the present invention. The operation of the asynchronous circuit in the simulation of the first embodiment will be described below in detail with reference to FIGS. 7A and 7B.

FIG. 7A is a timing chart of the asynchronous circuit in which the clock condition 21 is set such that the period (six times) of the clock signal CLK2 is equal to three times the period of the clock signal CLK1 (two times) and such that a phase difference between the active edges (the rising edges) is for one time. The operation (the simulation result) of the asynchronous circuit to which the input data Din having the pulse width of five times is supplied at the time T4 is described with reference to FIGS. 6A and 6B and FIG. 7A.

(1) Operation of Sequential Circuit

Period between Times T1 to T3: As an initial data, the flag indicating False is set to the meta stable state setting section 26. In this period, since there is no change in the input data Din, the steps S1, S2, S3, S4 and S5 are repeated. Also, the sequential circuit FF1 latches the value "0" of the input data Din supplied as the initial value and outputs as the output signal Q1.

Time T4: The clock signal CLK1 becomes active, and the change in the input data Din to the sequential circuit FF1 is detected (Steps S1 to S5: Yes). Consequently, the flag in the meta stable state setting section 26 is changed from False to True (Steps S6 and S7). Subsequently, the input data Din="1" is held as the variable d (Step S8). Also, the end time Te of the meta stable state is set as the time T8 (Step S9). Moreover, the sequential circuit FF1 latches the meta stable state data Dm ("1" or "0") and outputs as the output signal Q1 (Step S10, S11).

Time T5: Since the active edge of the clock signal CLK1 is not detected, the sequential circuit FF1 outputs the meta stable state data Dm as it is (Steps S10, S11).

Time T6: Although the clock signal CLK becomes active, the input data Din to the sequential circuit FF1 is not changed. Thus, the sequential circuit FF1 outputs the meta stable state data Dm as it is (Steps S1 to S5, No).

Time T7: Since the active edge of the clock signal CLK1 is not detected, the sequential circuit FF1 outputs the meta stable state data Dm in its original state (Steps S1 to S4, No).

Time T8: When the time reaches the end time Te (Steps S1 to S3: Yes), the flag in the meta stable state setting section 26 is changed to False (Step S14). Also, the variable d="1" held at the time T4 is outputted as the output signal Q1 (Step S15).

Time T9: Since the active edge of the clock signal CLK1 is not detected, the sequential circuit FF1 latches "1" of the input data Din in its original state and outputs as the output signal Q1.

Time T10: The clock signal CLK1 becomes active, and the sequential circuit FF1 outputs "0" of the input data Din as the output signal Q1.

It should be noted that in the logic circuit calculating section 251, when the time does not reach the end time Te, the logic circuit calculating section 251 is allowed to determine that the time reaches the end time Te, if the clock signal CLK2 of the sequential circuit FF2 becomes active.

(2) Operation of Sequential Circuit FF2

Period Between Times T1 to T4: In this period, there is no change in the signal level of the output signal Q1. Thus, the sequential circuit FF2 latches the signal level "0" of the output signal Q1 outputted as the initial value and outputs as the output signal Q2.

Time T5: In response to the active edge of the clock signal CLK2, the sequential circuit FF2 latches the output signal Q1 (the meta stable state data Dm) and outputs, as the output signal Q2 (the enable signal EN2), the meta stable state data Dm to the combinational circuit CC2 at the later stage.

Period Between Times T6 to T10: Since the active edge of the clock signal CLK2 is not detected, the sequential circuit FF2 outputs the meta stable state data Dm in its original state.

Time T11: The clock signal CLK2 becomes active, and "0" of the output signal Q1 is latched, and it is outputted as the output signal Q2 (the enable signal EN2) to the combinational circuit CC2.

As mentioned above, according to a circuit verifying method of the present invention, the meta stable state generated in the sequential circuit FF1 can be sent to the combinational circuit CC2 connected to the later stage of the sequential circuit FF2. Even if the time difference (the time Ta) between the active clocks when the sequential circuits FF1 and FF2 latch the input signals thereto is longer than the one period of the clock signal CLK1, the sequential circuit FF2 can send the meta stable state data Dm to the combinational circuit CC2. It should be noted that the steps S6, S12 and S13 may be omitted. For example, as shown in FIG. 7B, even if the time difference (the time Ta) between the active clocks is equal to or greater than 1.5 times the period of the clock signal CLK, the sequential circuit FF2 can send the meta stable state data Dm to the combinational circuit CC2.

When the period of the clock signal CLK2 is longer than the period of the clock signal CLK1 and the difference is large, the possibility that the time Ta becomes long increases. For this reason, in the conventional technique, the possibility that the meta stable state is sent to the combinational circuit which is connected to the sequential circuit FF2 is reduced, which requires the change of the clock condition and the execution of verification on many items. However, according to the verifying method of the present invention, the time in which the meta stable state is outputted from the sequential circuit FF1 can be set to be long, which extremely improves the possibility that the meta stable state is sent to the combinational circuit CC2. Thus, in the verifying method of the present invention, the asynchronous circuit can be verified at the small number of times. Also, the description of the asynchronous circuit necessary for the function simulation can be simplified, thereby shortening the time of the function simulation.

(Operation for Verifying Asynchronous Circuit at New Verification Mode)

Figure 8A:
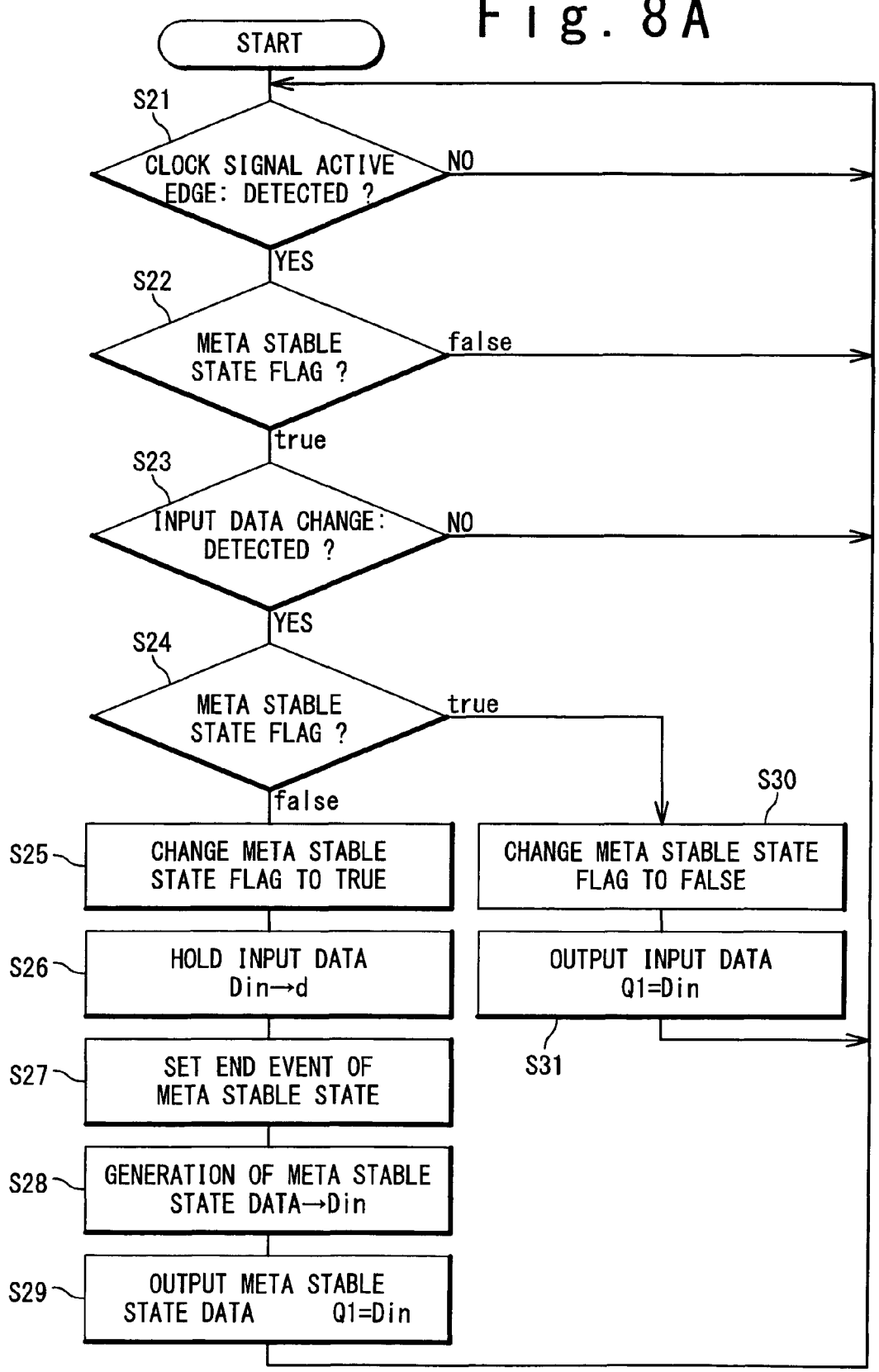
FIG. 8A is a flowchart showing an operation of the circuit verifying apparatus according to a second embodiment of the present invention.
Figure 8B:
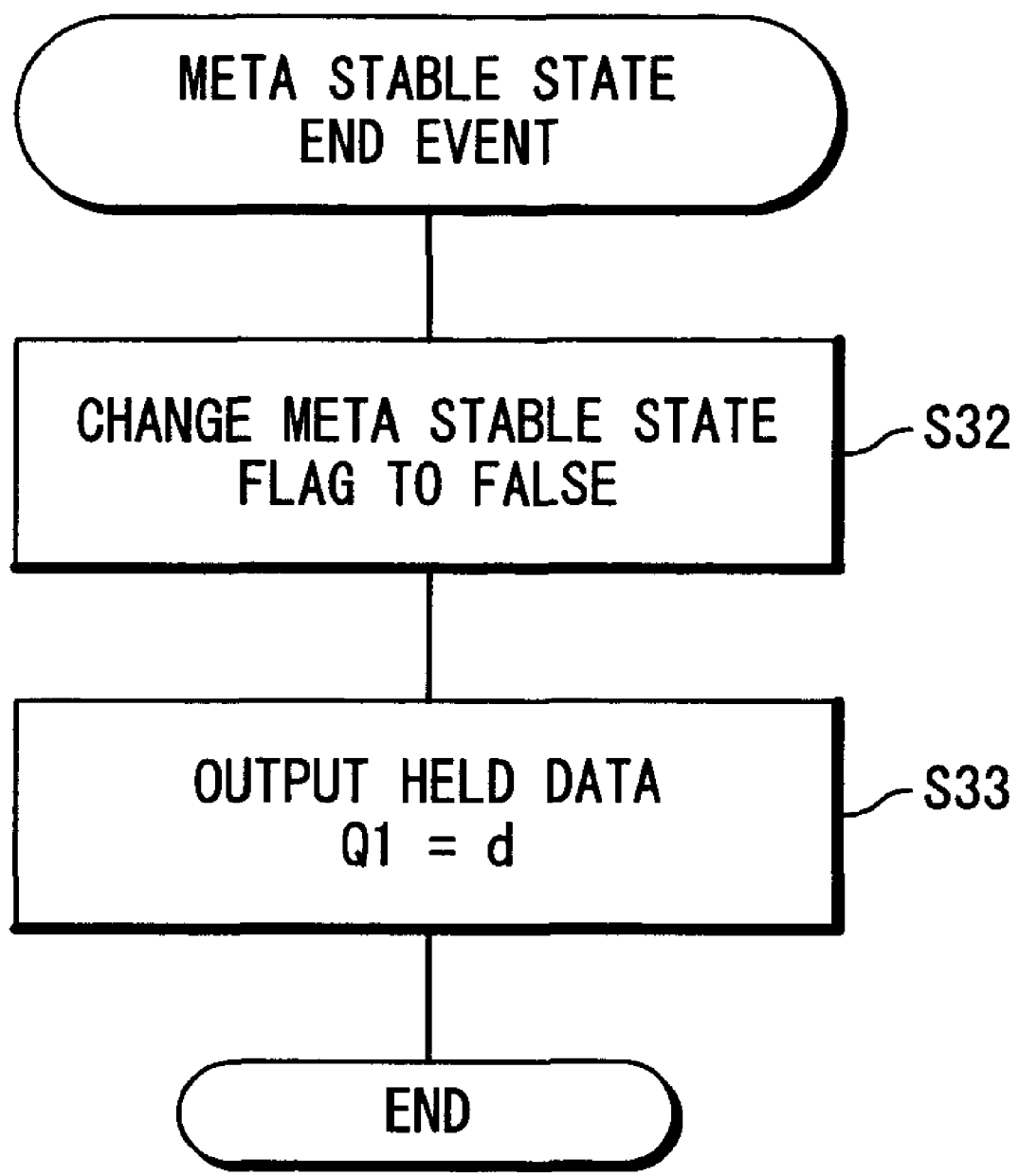
FIG. 8B is a flowchart showing the operation of the circuit verifying apparatus according to the second embodiment of the present invention.

The detail of the verification operation for the asynchronous circuit in the new verification mode by the circuit verifying apparatus 10 according to a second embodiment of the present invention will be described below with reference to FIGS. 7A and 7B and FIGS. 8A and 8B. FIGS. 8A and 8B are a flowchart showing an operation of determining the output data Q1 of the sequential circuit FF1 in the asynchronous circuit that is verified by the circuit verifying apparatus 10 of the present invention. The circuit verifying apparatus 10 in the second embodiment operates as an event-driven simulator for evaluating a signal value each time an event is generated. The event to execute the flowchart shown in FIG. 8A is defined as the detection of the active edge (for example, the rising edge) of the clock signal CLK1 to the sequential circuit FF1.

The detecting section 252 monitors the clock signal CLK1 until the detection of an active edge (Step S21). When the active edge of the clock signal CLK1 is detected, an event is generated. At this time, the logic circuit calculating section 251 refers to the meta stable state setting section 26 and checks whether or not the output is set to the meta stable state (Steps S21 and S22: Yes). Here, if the flag in the meta stable state setting section 26 is False, the operation flow returns to the step S1 and waits for a next event generation.

On the other hand, if the flag set in the meta stable state setting section 26 is True, the detecting section 252 extracts the input data Din at that time and compares it with the input data (the variable d) recorded in the input data storage section 23 (Step S23). If the detecting section 252 does not detect the change in the input data Din, namely, if the input data Din is equal to the variable d, the operation flow proceeds to the step S1 (Step S23, No). It should be noted that "0" is assumed to be set as the initial value of the variable d in this embodiment.

If the detecting section 252 detects the change in the input data Din, namely, if the input data Din indicates a value that differs from the variable d recorded in the input data storage section 23 (Step S23: Yes), the logic circuit calculating section 251 checks whether the flag in the meta stable state setting section 26 is True or False (Step S24). Here, if the flag in the meta stable state setting section 26 is False, the logic circuit calculating section 251 sets the flag of the meta stable state setting section 26 to True and sets the output of the asynchronous circuit to the meta stable state (Step S25). Through the steps S23 to S25, the asynchronous circuit, which was not in the meta stable state, is then set to the meta stable state on the basis of the change in the input data Din.

When the meta stable state flag is set to True, the detecting section 252 records the input data Din, which is extracted at the step S5, as the variable d in the input data storage section 23 (Step S26). Consequently, the input data d changed from the input data recorded at the previous time can be held as the input data Din. Also, the detecting section 252 sets an end event of the meta stable state (Step S27). Consequently, a period is set during which the asynchronous circuit as the verification target circuit is in the meta stable state. Here, when the set end event is generated, the meta stable state of the asynchronous circuit is ended. Thus, the period of the meta stable state is set in accordance with the generation time (the end time Te) of the end event. The generation time of the end event is set under a condition similar to that of the end time Te in the first embodiment.

At the step S25, when the flag indicating the meta stable state is set, the logic circuit calculating section 251 generates the meta stable state data Dm (any of "1" and "0") and outputs it as the output signal Q1 from the sequential circuit FF1 (Steps S28 and S29). Thus, the sequential circuit FF1 in the asynchronous circuit, which has been set to the meta stable state, outputs the meta stable state data Dm whose logic value is not determined, as the output signal Q1 corresponding to the incorrect input data. In the logic circuit calculating section 251, the operation flow proceeds to the step S21 after the step S29 and waits for the detection of a next active edge.

The steps S24 and S29 are a process when the input data Din is changed while the asynchronous circuit is not set to the meta stable state. Through the steps, the asynchronous circuit as the verification target circuit is set to the meta stable state. Then, the sequential circuit FF1 outputs the meta stable state data Dm whose logic value is not determined as the output signal Q1. At this time, the period of the enable state is also set.

On the other hand, if confirming that the flag in the meta stable state setting section 26 is True (Step S24: True), the logic circuit calculating section 251 changes the flag in the meta stable state setting section 26 to False (Step S30). Thus, the meta stable state set for the asynchronous circuit is released. In succession, in the logic circuit calculating section 251, the input data Din is latched by the sequential circuit FF1, and is outputted as the output signal Q1 (Step S31). After the step S31, the operation flow proceeds to the step S21 and waits for the coming of the next time Tn+1. Through the steps S30 and S31, the meta stable state is released in accordance with the change in the input data Din and then the input data Din is latched by the sequential circuit FF1. In this way, the simulation can be carried out as described above.

Next, when the end event set at the step S27 is generated, the operation flow proceeds to the process of the step S32. When the end event is generated, the logic circuit calculating section 251 sets the flag in the meta stable state setting section 26 to False (Step S32). Thus, the meta stable state of the asynchronous circuit is released. In succession, the logic circuit calculating section 251 outputs the variable d, which has been recorded in the input data storage section 23, as the output signal Q1 of the sequential circuit FF1 (Step S33). Through the step S32, the meta stable state is released in response to the end time Te, irrespectively of the presence or absence of the change in the input data Din. Also, the input data Din can be latched by the sequential circuit FF1, even if the clock signal CLK1 does not become active through the step S33. When the step S33 is ended, the operation flow departs from the flowchart shown in FIGS. 8A and 8B.

Also, the logic circuit calculating section 251 simulates the operation of the sequential circuit FF2 on the basis of the output signal Q1 from the sequential circuit FF1, similarly to the first embodiment. Moreover, the detecting section 252 records the value of the output signal Q2 (the enable signal EN2), which is outputted by the sequential circuit FF2 in the asynchronous circuit as the verification target circuit, in the output history database 27, similarly to the first embodiment.

(Operation of Asynchronous Circuit in Simulation)

The operation (the simulation result) of the asynchronous circuit to which the enable signal EN1 having the pulse width of five times is supplied at the time T4 will be described below with reference to FIGS. 8A and 8B and FIG. 7A.

(1) Operation of Sequential Circuit FF1

The active edges of the clock signal CLK1 are detected at the times T2, T4, T6, TB, T10, . . . , and the events are generated at these times.

Time T2: As the initial value, the flag indicating False is set in the meta stable state setting section 26. Thus, the detection of the next active edge is waited for (Steps S21, S22: False). Also, the sequential circuit FF1 latches the value "0" of the input data Din supplied as the initial value and outputs as the output signal Q1.

Time 4: The change in the input data Di to the sequential circuit FF1 is detected (Steps S21 to S23: Yes). Thus, the flag in the meta stable state setting section 26 is changed from False to True (Steps S24 and S25). Next, the input data Din="1" is held as the variable d (Step S26). Also, the end event of the meta stable state is set. At this time, the event generation time (the end time Te) is set to the time T8 (Step S27). Moreover, the sequential circuit FF1 latches the meta stable state data Dm ("1" or "0") and outputs as the output signal Q1 (Steps S28, S29).

Time T6: Since the input data Di to the sequential circuit FF1 is not changed, the sequential circuit FF1 outputs the meta stable state data Dm in its original state (Steps S21 to S23: No).

Time T8: When the time reaches the event generation time (the end time Te), the end event of the meta stable state is generated. Thus, the flag in the meta stable state setting section 26 is changed to False (Step S32). Also, the variable d="1" held at the time T4 is outputted as the output signal Q1 (Step S33).

Time T10: The sequential circuit FF1 outputs the value "0" of the enable signal EN1 as the output signal Q1.

It should be noted that when the clock signal CLK2 of the sequential circuit FF2 becomes active prior to the end event generation, the logic circuit calculating section 251 may determine that the time reaches the end time Te. Also, the steps S24, S30 and S31 may be omitted.

Since the operation of the sequential circuit FF2 in the second embodiment is similar to the operation in the first embodiment, the description is omitted.

(Verifying Operation)

The entire operation of the function verification of the asynchronous circuit according to the second embodiment of the present invention will be described below with reference to FIG. 9. The circuit verifying apparatus 10 according to the present invention firstly carries out the function verification of the verification target circuit shown in FIG. 5 in the usual verification mode (Step S101). At this time, the verification results (the signal level, the delay time and the like) at the verification positions scheduled in the combinational circuit CC2 are recorded as the execution result A in the execution result database 28. Subsequently, the circuit verifying apparatus 10 carries out the function verification of the verification target circuit shown in FIG. 5 in the new verification mode (Step S102). At this time, the circuit verifying apparatus 10 records the verification results of the same verification positions as at the step S101 in the execution result database 28 as the execution result B. At a step S102, it is possible to obtain the verification results when the enable state generated in the sequential circuit FF1 is outputted to the combinational circuit CC2. If the execution result A and the execution result B do not coincide (Step S103: No), the output result analyzing section 253 modifies the verification target circuit data 21 (Step S104). The logic circuit calculating section 251 again performs the steps S101 and S103 on the modified verification target circuit data 21. The circuit verifying apparatus 10 repeats the verification and comparison between the two modes until the execution result A and the execution result B coincide, and ends the verifying process when they coincide (Step S103: Yes). Thus, it is possible to check that there is no difference between the usual function verification result and the function verification result in the meta stable state.

As mentioned above, according to the circuit verifying apparatus and the circuit verifying method of the present invention, even if the period difference between the transmission and reception clock signals is large in the asynchronous circuit, the meta stable state can be sent to the sequential circuit on the reception side. Thus, even if the phase difference between the active edges of the transmission and reception clock signals exceeds one period of the clock signal on the transmission side, the circuit verification can be performed. Also, in the function verification of the asynchronous circuit in which the meta stable state is simulated, the meta stable state of the sequential circuit on the transmission side is efficiently sent to the sequential circuit on the reception side. Thus, the number of times of verification error generated in the conventional technique is reduced. Therefore, the number of times of the function verification for the asynchronous circuit can be reduced, thereby shortening the verification time. Moreover, the meta stable state can be surely transferred between the sequential circuits, thereby simulating the operation close to the actual asynchronous circuit.

As mentioned above, the embodiments of the present invention have been described in detail. However, the configuration is not limited to the above-mentioned embodiments. Even the various changes and modifications without departing from the spirit of the present invention are included within the scope of the present invention.

What is claimed is:

1. A circuit verifying method for a logic circuit of a first sequential circuit which outputs a first data based on an input data in synchronization with a first clock signal, and a second sequential circuit which outputs a second data based on the first data in synchronization with a second clock signal with a period longer than that of the first clock signal, said circuit verifying method comprising:
    detecting a change of the input data in synchronization with the first clock signal;
    outputting a data indicating a meta stable state during a period longer than one period of the first clock signal based on the change of the input data as the first data;
    storing the changed input data in a storage unit based on the change of the input data; and
    outputting the changed input data which has been stored in the storage unit as the first data after stopping the output of the data indicating the meta stable state.

2. The circuit verifying method according to claim 1, further comprising:
    when detecting the change of the input data while outputting the data indicating the meta stable state, stopping the output of the data indicating the meta stable state without waiting for end of said period.

3. The circuit verifying method according to claim 1, wherein said outputting a data indicating a meta stable state comprises:
    setting the period shorter than the period of the second clock signal to the storage unit as said period; and
    stopping the output of the data indicating meta stable state when said period has passed.

4. The circuit verifying method according to claim 3, wherein said setting a period shorter than the period of the second clock signal comprises:
    setting the meta stable state of the first sequential circuit to the storage unit and an end time of the meta stable state to the storage unit in response to the change of the input data; and
    outputting the data indicating the meta stable state as the first data while the meta stable state of the first sequential circuit is set, and
    said stopping the output of the data indicating meta stable state comprises:
    cancelling the setting of the meta stable state of the first sequential circuit when the end time of the meta stable state has come.

5. The circuit verifying method according to claim 4, wherein said stopping the output of the data indicating the meta stable state comprises:
    cancelling the setting of the meta stable state of the first sequential circuit when detecting the change of the input data while the meta stable state of the first sequential circuit is set.

6. The circuit verifying method according to claim 1, further comprising:
    periodically storing the second data in the storage unit.

7. The circuit verifying method according to claim 1, further comprising determining whether an output of the second sequential circuit includes a transmission of the data indicating the meta stable state, the second sequential circuit being synchronized with the second clock signal with the period greater than a period of the first clock signal,
    wherein the output of the data indicating the meta stable state is received by the second sequential circuit from the first sequential circuit.

8. A circuit verifying apparatus for a logic circuit of a first sequential circuit which outputs a first data based on an input data in synchronization with a first clock signal, and a second sequential circuit which outputs a second data based on the first data in synchronization with a second clock signal with a period longer than that of the first clock signal, said circuit verifying apparatus comprising:
    a detecting section configured to detect a change of the input data in synchronization with the first clock signal;
    a logic circuit calculating section configured to output a data indicating a meta stable state during a period longer than one period of the first clock signal based on the change of the input data as the first data; and
    a storage unit in which the changed input data is stored based on the change of the input data,
    wherein said logic circuit calculating section outputs the changed input data which has been stored in said storage unit as the first data after stopping the output of the data indicating the meta stable state.

9. The circuit verifying apparatus according to claim 8, wherein said logic circuit calculating section stops the output of the data indicating the meta stable state after said period, when detecting the change of the input data while outputting the data indicating the meta stable state.

10. The circuit verifying apparatus according to claim 8, wherein said logic circuit calculating section sets the period shorter than the period of the second clock signal to said storage unit as said period, and stops the output of the data indicating meta stable state when said period has passed.

11. The circuit verifying apparatus according to claim 10, wherein said logic circuit calculating section:

sets the meta stable state of the first sequential circuit to said storage unit and an end time of the meta stable state to the storage unit in response to the change of the input data, outputs the data indicating the meta stable state as the first data while the meta stable state of the first sequential circuit is set, and cancels the setting of the meta stable state of the first sequential circuit when the end time of the meta stable state has come.

12. The circuit verifying apparatus according to claim 11, wherein said logic circuit calculating section cancels the setting of the meta stable state of the first sequential circuit when detecting the change of the input data while the meta stable state of the first sequential circuit is set.

13. The circuit verifying apparatus according to claim 8, wherein said detecting section periodically stores the second data in said storage unit.

14. The circuit verifying apparatus according to claim 8, wherein the logic circuit calculating section sets the second sequential circuit as a verification target circuit to be in the meta stable state and outputs the data indicating the meta stable state from the first sequential circuit to the second sequential circuit.

15. A tangible non-transitory computer-readable medium in which a computer executable instructions code is stored to cause the computer to realize a circuit verifying method for a logic circuit of a first sequential circuit which outputs a first data based on an input data in synchronization with a first clock signal, and a second sequential circuit which outputs a second data based on the first data in synchronization with a second clock signal with a period longer than that of the first clock signal, wherein said circuit verifying method comprises:

detecting a change of the input data in synchronization with the first clock signal;

outputting a data indicating a meta stable state during a period longer than one period of the first clock signal based on the change of the input data as the first data;

storing the changed input data in a storage unit based on the change of the input data; and outputting the changed input data which has been stored in the storage unit as the first data after stopping the output of the data indicating the meta stable state.

16. The computer-readable medium according to claim 15, wherein said circuit verifying method further comprises:

when detecting the change of the input data while outputting the data indicating the meta stable state, stopping the output of the data indicating the meta stable state without waiting for end of said period.

17. The computer-readable medium according to claim 15, wherein said outputting a data indicating a meta stable state comprises:

setting the period shorter than the period of the second clock signal to the storage unit as said period; and stopping the output of the data indicating meta stable state when said period has passed.

18. The computer-readable medium according to claim 17, wherein said setting a period shorter than the period of the second clock signal comprises:

setting the meta stable state of the first sequential circuit to the storage unit and an end time of the meta stable state to the storage unit in response to the change of the input data; and outputting the data indicating the meta stable state as the first data while the meta stable state of the first sequential circuit is set, and said stopping the output of the data indicating meta stable state comprises:

cancelling the setting of the meta stable state of the first sequential circuit when the end time of the meta stable state has come.

19. The computer-readable medium according to claim 18, wherein said stopping the output of the data indicating the meta stable state comprises:

cancelling the setting of the meta stable state of the first sequential circuit when detecting the change of the input data while the meta stable state of the first sequential circuit is set.

20. The computer-readable medium according to claim 15, wherein said circuit verifying method further comprises:

periodically storing the second data in the storage unit.

\* \* \* \* \*